United States Patent [19]
Batterton et al.

[11] 4,446,631
[45] May 8, 1984

[54] AIR SYSTEM FOR CONTINUOUS FLOW GRAIN DRYER

[75] Inventors: Elmo L. Batterton; Melvin J. Lonsdale, both of Morton, Ill.

[73] Assignee: Meyer Morton Company, Morton, Ill.

[21] Appl. No.: 344,499

[22] Filed: Feb. 1, 1982

[51] Int. Cl.³ .................................................. F26B 17/12
[52] U.S. Cl. .................................................. 34/65; 34/86; 34/174
[58] Field of Search .............................. 34/65, 86, 174; 165/DIG. 5

[56] References Cited

U.S. PATENT DOCUMENTS

| | | | |
|---|---|---|---|
| 759,527 | 5/1904 | Irwin | 34/174 |
| 2,634,673 | 4/1953 | Maho | 34/174 |
| 3,440,734 | 7/1967 | Batterton et al. | 34/65 |
| 3,648,167 | 3/1972 | Purdy et al. | 165/DIG. 5 |
| 4,038,758 | 8/1977 | Miller | 34/174 |

Primary Examiner—Larry I. Schwartz
Assistant Examiner—David W. Westphal
Attorney, Agent, or Firm—Hill, Van Santen, Steadman & Simpson

[57] ABSTRACT

In a continuous flow vertical grain dryer, heated air is supplied into a closed top plenum through means of a stack opening upwardly therein, and fresh air is supplied to the stack from as nearly as practicable fines-free ambient atmosphere by receiving the fresh air from a relatively fines-free ambient atmosphere zone, e.g., above the discharge from the vertical pervious wall of the dryer of spent grain-drying air. Efficient heat transfer and preheating of the fresh air by association of a fresh air duct with the stack is provided for.

11 Claims, 4 Drawing Figures

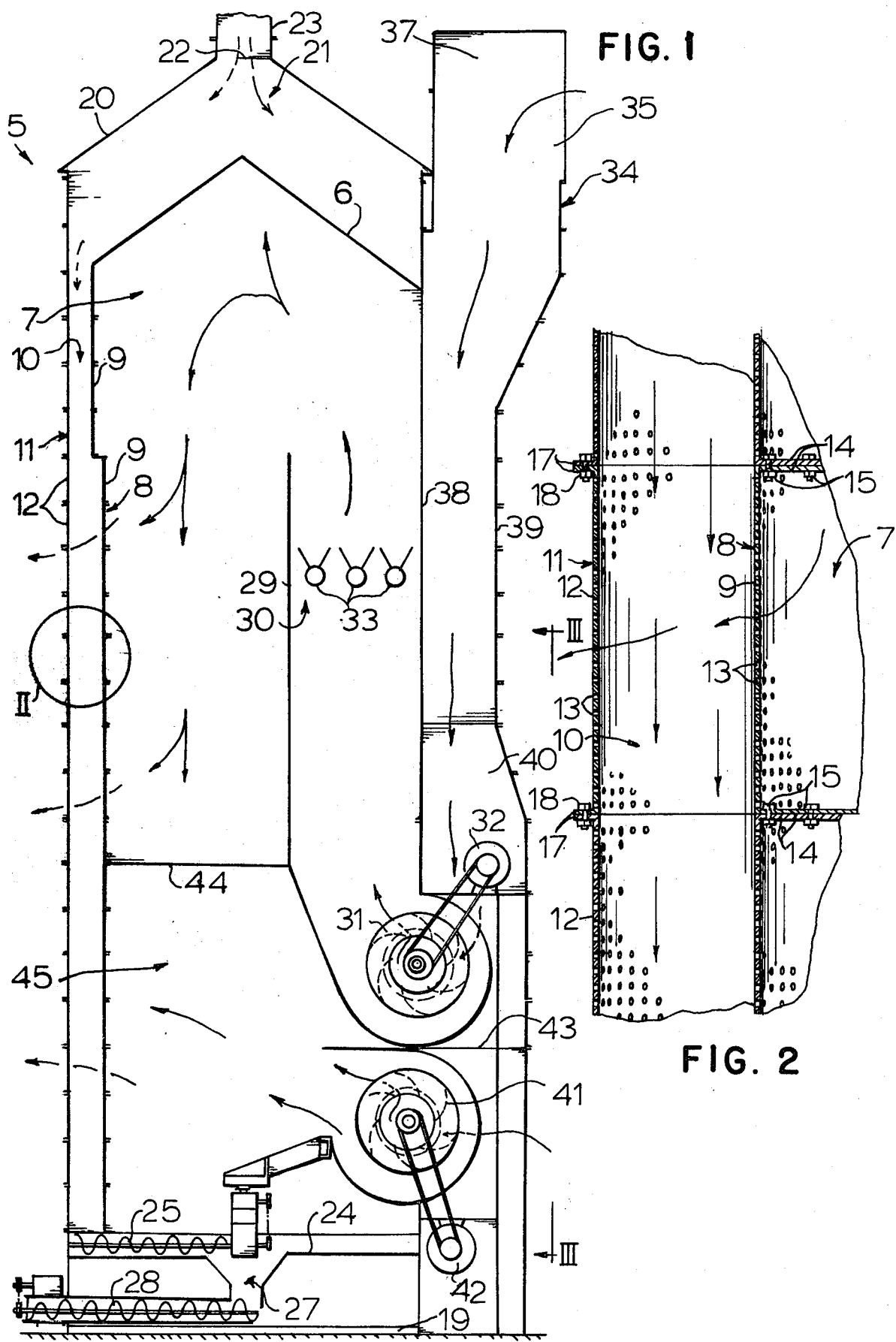

AIR SYSTEM FOR CONTINUOUS FLOW GRAIN DRYER

BACKGROUND OF THE INVENTION

1. Field of the Invention

This invention or discovery relates to continuous flow grain dryers of the type having a vertical closed top plenum provided with a heated forced air supply. A vertical grain shower passage surrounds the plenum and the heated air in passing through air pervious spaced vertical walls defining the plenum and the passage, dries the showering grain.

2. Description of the Prior Art

A prime example of a grain dryer of the type with which the present invention is concerned is found in U.S. Pat. No. 3,440,734, issued to the present applicants. To any extent necessary, the disclosure of that patent is incorporated herein by reference.

Although the patented structure has proved to be quite successful, it has been found that some grains or grain batches having a relatively high fines content such as chaff or dust cause the ambient air to become unduly loaded with the fines blown from the grain during the drying process. Inasmuch as the heated air supplied to the dryer plenum must for highest efficiency pass through or in contact with open heating means, comprising in the preferred arrangement open gas flames, dust laden air presents a fire or even explosion hazard. Although any grain may present a dust problem, e.g., shelled corn, milo, wheat, barley, oats, soy beans, and the like, a special problem has been encountered with the drying of sunflower seeds. Herein all types of grain which may be dried in this type of dryer will be referred to generically as grain.

In the dryer as disclosed in the aforesaid patent, the air entering the blower for the heated air supply is drawn in at a location near the lower end of the dryer, just above the cool air chamber under the heated air plenum. Therefore, where the ambient air, from which the air for the heated air blower system is derived, is heavily laden with fines the hazards just mentioned are of considerable concern.

SUMMARY OF THE INVENTION

The present invention overcomes the above-noted problem by assuring that the heated air system will be as nearly as practicable free from fines that may be discharged with the spent drying air, that is the air discharged into the atmosphere in the ambient about the dryer.

This invention also improves the operation of the dryer by utilizing otherwise wasted heat for preheating the fresh air delivered to the heated air system.

To this end, the invention provides in a continuous flow grain dryer of the type having means defining a vertical closed top plenum provided with forced heated air supplying means and being substantially surrounded by a vertical grain shower passage with means for delivering grain to be dried into the top of said passage, said plenum means having a vertical air pervious wall providing the inner wall of said passage, and said passage having an air pervious outer wall spaced from said inner wall so that heated air is adapted to pass outwardly through said walls and traverse said passage for drying the showering grain, the improvement comprising air intake means communicating with said heated air supplying means, and having an inlet in an ambient atmosphere zones, e.g., at a height above the air pervious area of said outer wall, for receiving fresh air which is as nearly as practicable free from detrimental fines that may be discharged with the spent drying air through said outer wall.

The invention also provides, in a continuous flow grain dryer of the type aforesaid, a method of delivering air to the heated air supplying means by receiving fresh air through an inlet in a relatively fines-free ambient atmosphere zone, e.g., at about the height of the plenum closed top, and directing the air to the heated air supplying means, so that the fresh air so delivered will be as nearly as practicable free from detrimental fines that may be discharged with the spent drying air into the ambient about the dryer.

In a further aspect of the invention, a heated air stack and a fresh air duct are related for preheating the fresh air.

BRIEF DESCRIPTION OF THE DRAWINGS

Other objects, features and advantages of the invention will be readily apparent from the following description of a representative embodiment thereof, taken in conjunction with the accompanying drawings, although variations and modifications may be effected without departing from the spirit and scope of the novel concepts embodied in the disclosure, and in which:

FIG. 1 is a diagramatic vertical sectional elevational view of a continuous flow grain dryer embodying principles of the present invention;

FIG. 2 is an enlarged fragmentary detail view taken in the area indicated at II in FIG. 1;

DESCRIPTION OF A PREFERRED EMBODIMENT

Figure 3:
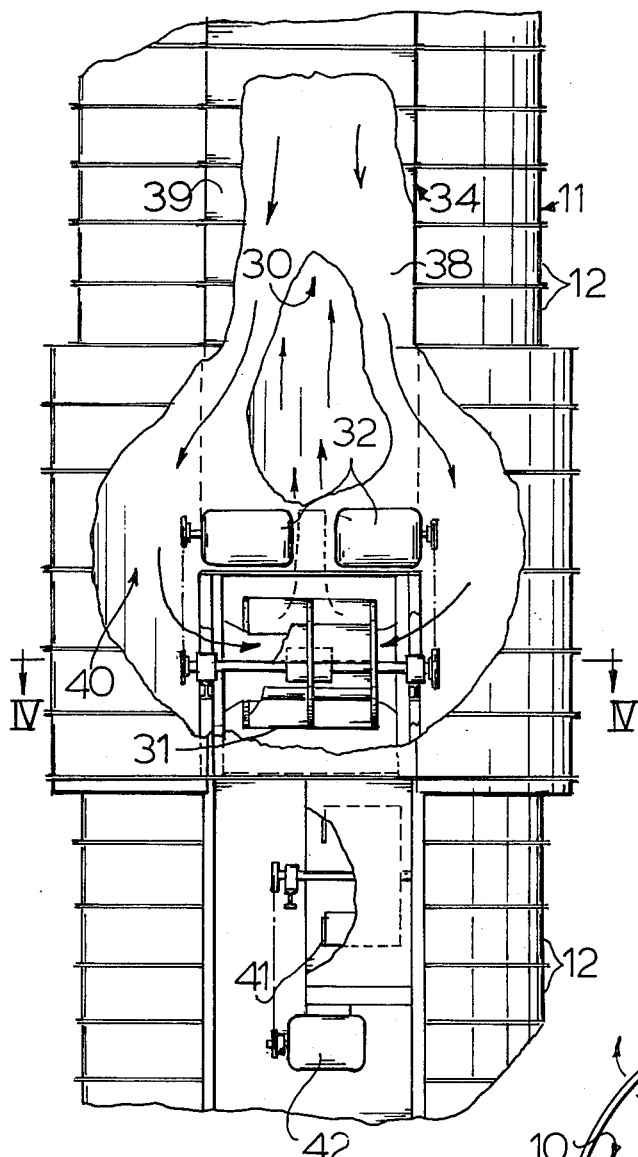
FIG. 3 is a fragmentary elevational view partially broken away and taken substantially in the plane of vertical line III—III of FIG. 1.

On reference to FIG. 1, a dryer 5 is illustrated as in the form of a vertically disposed tank-like structure which may be made in various heights and widths to meet operating capacity requirements. Means defining a vertical, heated air plenum 7 comprise a generally conical or peaked upwardly projecting top closure 6 atop a vertical, generally tubular air pervious wall 8 made up of easily assembled complementary sections 9.

The plenum wall 8 provides the inner wall of a vertical grain shower passage 10 defined by and between the wall 8, as its inner wall, and an outer tubular wall 11 which surrounds the wall 8 in suitably spaced relation and is also air pervious. Similarly as the wall 8, the wall 11 is desirably made up of complementary, easily assembled secions 12. As best seen in FIG. 2, each of the sections 9 and 12 may be formed from vertically extending suitably shaped sheet material such as sheet metal treated in any preferred manner against corrosion and having a preferably uniform pattern array of small perforations 13, preventing grain escape but permitting passage of heated drying air from the plenum 7 to traverse the grain shower passage 10 in grain drying relation and then discharged through the pervious wall 11. Conveniently, the wall sections 9 may have inturned attachment flanges 14 which abut one another and are secured together as by means of bolts 15. Similarly, the outer wall panels 12 may have radially outwardly projecting attachment flanges 17 which are in abutment in assembly and are secured together as by means of bolts 18.

At its lower end the ouer wall 11 is supported by means of a suitable base 19. Although the upper end of the wall 11, which extends to a suitable height above the peak of the plenum cover top 6 may be open and thus receive grain from a chute thereabove, in a desirable arrangement, a roof 20 is carried by the top of the wall 11 and is of generally complementary shape to the plenum top 6. Means for delivering grain into a garner chamber 21 defined by the space between the top 6 and the roof 20, comprises a delivery port 22 desirably concentric with the peak of the plenum top 7 and through which grain to be dried is received through a duct 23. Grain delivered through the port 22 descends substantially uniformly down the top 6 and drops in a shower down the drying passage 10. Adjacent to the bottom of the passage 10 the grain is received on a floor 24 from which the grain is moved by means of a sweep auger 25 into a well 27 from which a conveyor auger 28 delivers the grain to a discharge point.

Means are provided for supplying heated air under moderate velocity but adequate volume for the intended purpose to the plenum 7. Herein such means comprise a stack structure 29 defining an upwardly opening flue 30 located within the plenum 7 but with its upper end open and located sufficiently below the top closure deflector 6 to permit ready access into the plenum 7 and fairly uniform distribution of heated air within the plenum for efficient drying expansion of the heated air through the pervious walls 8 and 11. Communicating with the lower end of the flue 30 is air propelling means desirably comprising a centrifical fan assembly 31 of adequate capacity (FIGS. 1, 3, and 4) driven by at least one, and in the present instance two electrical motors 32. Air is drawn into each end of the fan 31 and driven up the flue 30, substantially as indicated by directional arrows. Within the flue 30, the air is heated to a desired temperature by suitable heat producing means such as gas burners 33 arranged for efficiently heating all of the air passing upwardly in the flue.

Assurance is provided that the air supply to the blower 31 will be as nearly as practicable free from fines that may be discharged with the spent drying air through the outer air pervious wall 11 of the grain shower passage 10, and which fines may thus be present in undesirable concentration in the ambient air in a discharge atmosphere zone about the wall 11, the density depending upon ambient air movement. Should the ambient air be relatively still, a considerable density of fines may remain in the ambient air discharge atmosphere zone about the dryer and gradually settle downwardly. Since the spent drying air moves horizontally out of the pervious chamber wall 11, fines will be inclined to settle downwardly in a quiet ambient and thus little if any fines will be present in the ambient at about the elevation of the closure and deflector top 6 over the plenum 7. If there is a lively movement of ambient air from any direction past the dryer 5, spent drying air even if rather heavily laden with fines will be rapidly diluted except that on the lee side of the dryer fines may tend to reach a considerable concentration. For maximum efficiency, the blower fan 31 should be in direct communication with the lower end of the heated air flue 30. Therefore, if fresh air is supplied to the blower fan 31 at its most efficient elevation, which is in the lower part of the dryer housing, the air supply would be highly susceptible to undesirable fines concentration where the grain being processed is heavily contaminated with fines.

In order to avoid any problem with undesirable fines content in the air supplied to the blower fan 31, air intake means are provided in an ambient fresh air atmosphere zone which will receive fresh air relatively free from fines or at least so dispersed as to be inconsequential, and conveniently located at a height about the ambient zone into which the fines are discharged in operation of the dryer. To this end, an air inlet duct 34 has a fresh air inlet 35 which, as shown in FIG. 1, is located at a height above the area of the air pervious outer wall 11 from which any undesirable concentration of fines may be discharged. In a preferred arrangement, the duct 34 is provided with a relatively large capacity upper end inlet chamber 37 located to extend above the roof 20 and into which the inlet 35 opens in a direction facing generally away from the dryer wall 11 and the discharge atmosphere zone. From the intake chamber 37, the duct 34 extends downwardly to the fan 31, through and bypassing the ambient discharge atmosphere zone in which there may be an undesirable concentration of fines blown from the grain being dried. As shown, air impervious walls of the duct 34 shield it against entry of fines-containing air from the discharge atmosphere zone. Further shielding protection against entry of fines-containing air into the duct 34 is provided by having the wall of the large capacity chamber 37 of the duct 34 in an underslug arrangement as a generally downwardly facing deflector below the inlet 35, as seen in FIG. 1.

Figure 4:
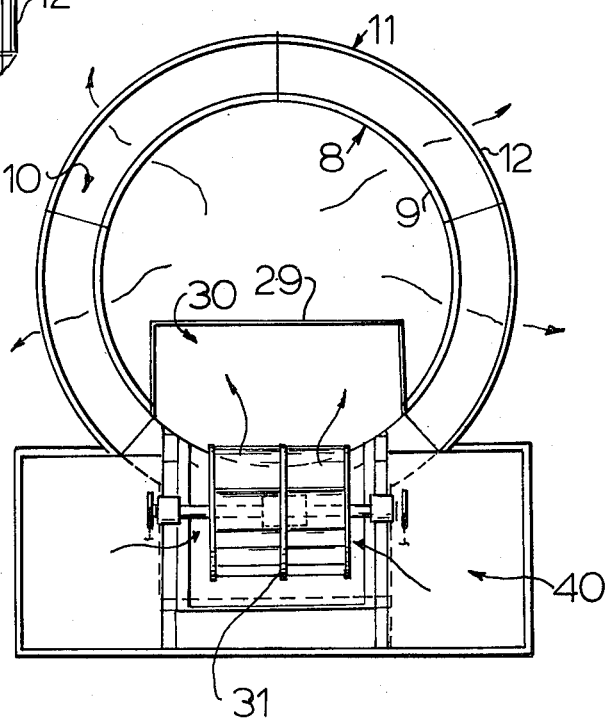
FIG. 4 is a horizontal sectional detail view taken substantially along the line IV—IV of FIG. 3.

Heat is conserved by having a wall 38 common to the inner side of the duct 34 and the outer side of the stack 29. Thereby heat loss is avoided from the flue 30. Any heat radiating through the wall 38 preheats the fresh air travelling down through the duct 34 toward the lower fan 31. Thus, greater efficiency is attained from the heat produced by the heaters 33 as compared to an arrangement where the outer wall of the stack 29 is exposed to the amibient atmosphere. Heat transfer efficiency is improved by having the length of the duct 34 for a distance above and below the elevation of the heaters 33 of reduced cross-sectional flow area, as shown at 39, relative to the cross-sectional flow area of the intake chamber 37 and a supply chamber 40 aligned with the blower fan 31. Through this arrangement and by having the inlet 35 of unrestricted cross-sectional flow area as compared to the heat transfer duct length 39, full blower fan capacity is attained while nevertheless as the air is drawn downwardly through the heat transfer section 39 it attains accelerated velocity with a pressure drop into the substantially expanded volumetric area of the chamber 40, which, as shown in FIGS. 1, 3 and 4, is uniformly enlarged at each side of the blower fan 31 so that uniform and abundant air intake into the opposite ends of the fan is assured.

After the grain has descended approximately two thirds of the distance down the grain shower passage 10, most of the moisture desired to be removed from the grain will generally have been removed so that subjecting the grain to further heated air might be detrimental. Therefore, a cooling air fan 41, driven as by means of a motor 42 is located below a partition 43 which separates it from the blower fan 31. The lower end of the stack 29 and a partition 44 between the stack and the pervious wall 8 separates a cooling air chamber 45 from the plenum 7. The fan 41 draws cool air from the ambient atmosphere and drives it into the cooling air chamber 45 from which the cool air passes through the pervious walls 8 and 11 and the lower portion of the passage 10 for cooling the descending grain.

It will be understood that variations and modificaions may be effected without departing from the spirit and scope of the novel concepts of this invention.

I claim as my invention:

1. In a continuous flow grain dryer especially useful for handling grain having a relatively high fines content, said dryer being of the type having means defining a vertical closed top plenum provided with forced heated air supplying means and being substantially surrounded by a vertical grain shower passage with means for delivering grain to be dried into the top of said passage, said plenum having a vertical air pervious wall providing the inner wall of said passage, and said passage having an air pervious outer wall spaced from said inner wall so that heated air is adapted to pass outwardly through said walls and traverse said passage for drying the showering grain and then exhasuting into a discharge atmosphere zone contiguous to said outer wall, the improvement comprising:

a vertically extending air intake duct having an air intake chamber at its upper end projecting above the air pervious area of said outer wall, and said duct communicating at its lower end with said heated air supplying means;

an air inlet into said chamber and facing generally away from said outer wall and said discharge atmosphere zone toward an ambient atmosphere zone above and remote from said discharge atmosphere zone so that fresh air for delivery by said intake duct to said heated air supplying means is received by said inlet and which fresh air is as nearly as practicable free from fines that may be discharged with the spent drying air through said outer wall into said discharge atmosphere zone;

said duct extending down through said discharge atmosphere zone and having air impervious walls which shield the duct against entry of fines-containing air from said discharge atmosphere zone.

2. A grain dryer according to claim 1, wherein said heated air supplying means comprises a stack defining a flue opening into said plenum, and said stack and said duct being separated by a common heat transfer wall.

3. A dryer according to claim 2, wherein said stack has air heating means below the top of the stack and said common wall extends along the area of said stack having said heating means.

4. A dryer according to to claim 3, wherein said duct has air flow accelerating means along said common wall.

5. A grain dryer according to claim 4, wherein said flow accelerating means comprises a reduced cross section flow area section of said duct and the portion of the duct above and below said reduced flow area section being of substantially larger cross section flow area capacity providing said intake chamber at the top of the duct and an air expansion chamber at the lower end of said duct communicating with an air impeller device which drives the air upwardly in said flue in said stack.

6. A grain dryer according to claim 1, having the lower side of said chamber underslung and providing a deflecting shield for improving assurance against upward movement of air from said discharge atmosphere zone toward said inlet.

7. In a continuous flow grain dryer especially useful for handling grain having a relatively high fines content, said dryer being of the type having means defining a vertical cloed top plenum provided with forced heated air supplying means and being substantially surrounded by a vertical grain shower passage with means for delivering grain to be dried into the top of said passage, said plenum having a vertical air pervious wall providing the inner wall of said passage, and said passage having an air pervious outer wall spaced from said inner wall so that heated air is adaped to pass outwardly through said walls and traverse said passage for drying the showering grain and then exhausting into a discharge atmosphere zone contiguous to said outer wall, the method comprising:

providing a vertically extending air intake duct with an air intake chamber at its upper end projecting above the air pervious area of said outer wall and located in an ambient fresh air atmosphere zone above and remote from said discharge atmosphere zone;

receiving fresh air from said ambient fresh air atmosphere zone into said chamber through an air inlet facing generally away from said outer wall and from said discharge atmosphere zone, so that said fresh air is as nearly as practicable free from fines that may be discharged with the spent drying air through said outer wall into said discharge atmosphere zone;

extending said duct down through said discharge atmosphere zone and providing said duct with air impervious walls and thereby shielding the duct against entry of fines-containing air from said dicharge atmosphere zone;

and effecting communication from said chamber through said duct and the lower end of said duct with said heated air supplying means.

8. A method according to claim 7, which comprises shielding said inlet against upward movement of air from aid discharge atmosphere zone by locating said chamber over an underslung deflecting shield structure.

9. A method according to claim 7, which comprises in said heated air supplying means heating the air in a flue that opens upwardly withing said plenum, and causing said fresh air to flow in said duct along a common wall with said flue in heat transfer relation to said heating means and thereby preheating the fresh air and then communicating the fresh air with said flue for further heating by said heating means before discharge into said plenum.

10. A method according to claim 9, which comprises accelerating flow of said fresh air as it is being preheated in said duct.

11. In a continuous flow grain dryer of the type having means defining a vertical closed top plenum provided with foced heated air supplying means and being substantially surrounded by a vertical grain shower passage with means for delivering grain to be dried into the top of said passage, said plenum means having a vertical air pervious wall providing the inner wall of said passage, and said passage having an air pervious outer wall spaced from said inner wall so that heated air is adpated to pass outwardly through said walls and traverse said passage for drying the showering grain, the improvement comprising:

said heated air supplying means comprising a stack within said plenum and defining an upwardly opening flue;

air heating means in said flue;

a downwardly extending, top open fresh air duct having a passage therethrough enclosed within an air impervious wall of which a portion is common with said flue for heat transfer from said heating means through said duct wall into said duct passage;

air impelling means operative to draw air downwardly through said duct and impel the air upwardly through said flue;

said duct having an enlarged air intake chamber at the upper end of the duct passage and which chamber is located at least in part above the air pervious area of said outer wall;

said intake chamber having an air inlet located at an elevation above the elevation of a roof over the closed top of said plenum and said inlet facing away from said outer wall of said grain shower passage and said roof;

and the lower side of said chamber being underslung below said air inlet and providng a deflecting shield for improving assurance against upward movement of air toward said inlet from the atmosphere which surrounds said pervious outer wall.

* * * * *